July 26, 1955 — T. M. RAGAN — 2,713,913
CASING SCRAPERS AND FEELERS
Original Filed Jan. 11, 1949 — 2 Sheets-Sheet 1
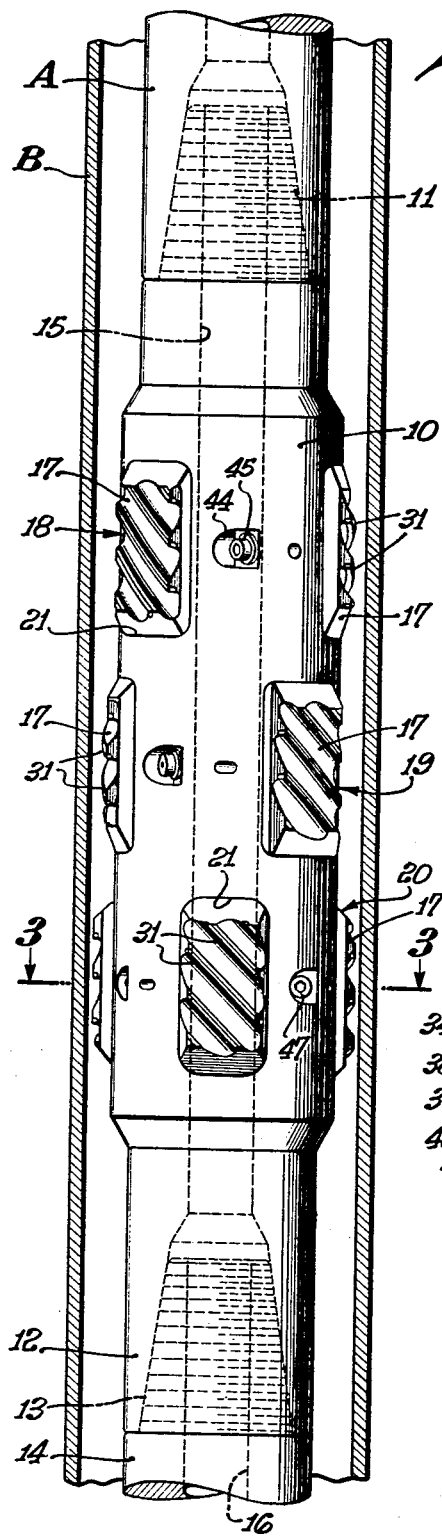
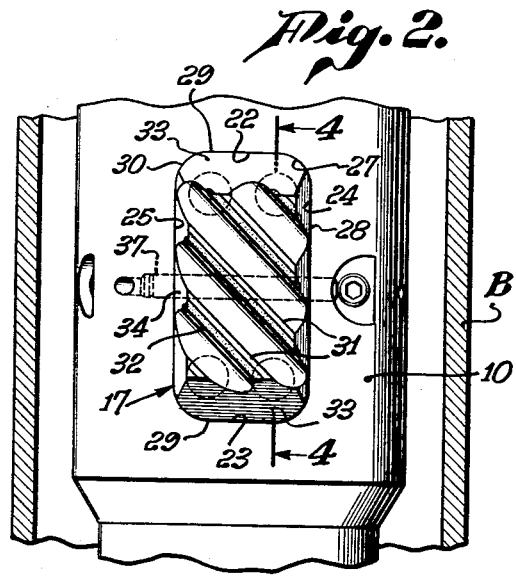
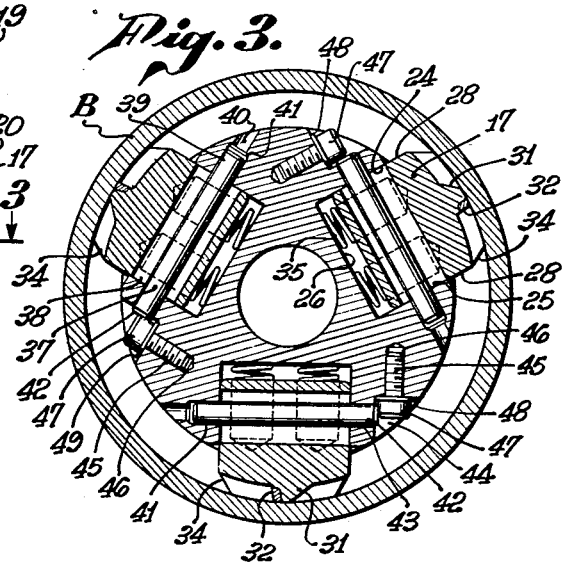
THOMAS M. RAGAN,
INVENTOR.
BY
Mellin and Hanscom
ATTORNEYS

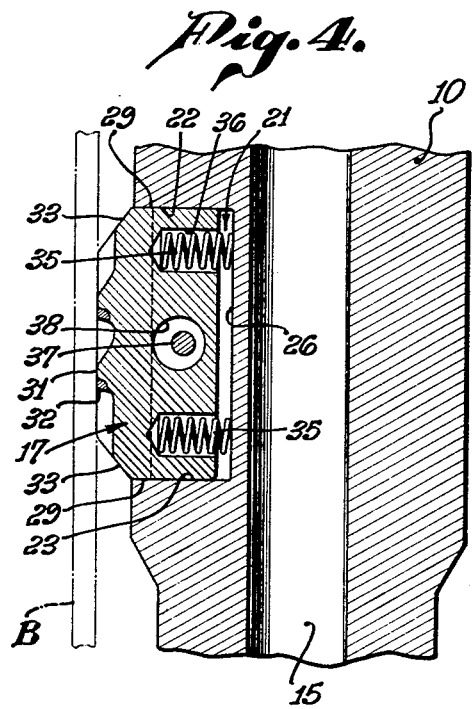
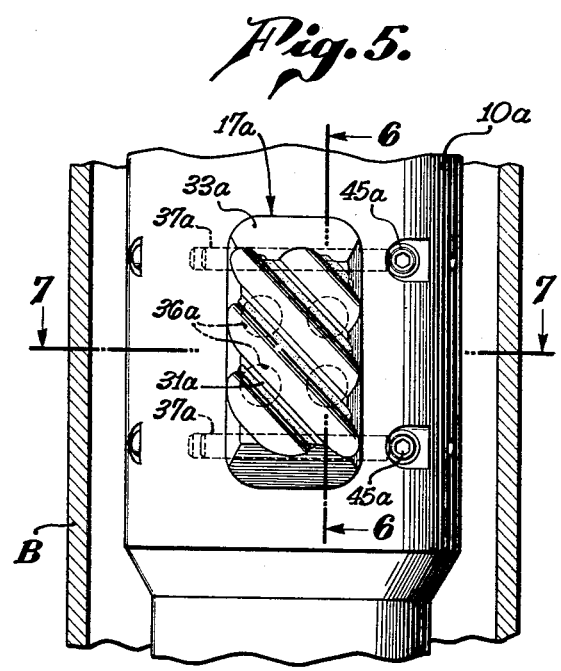
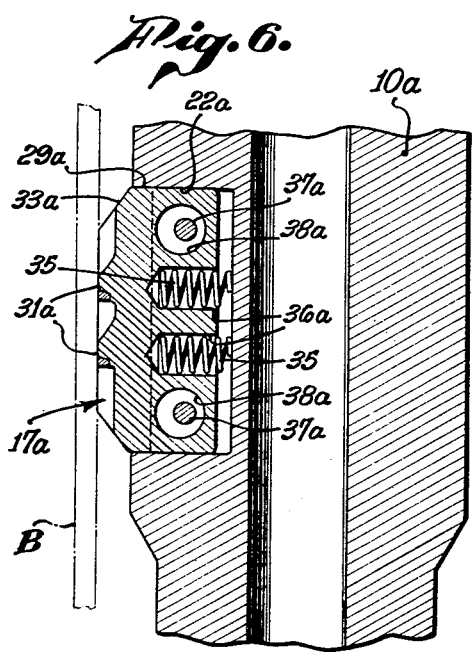
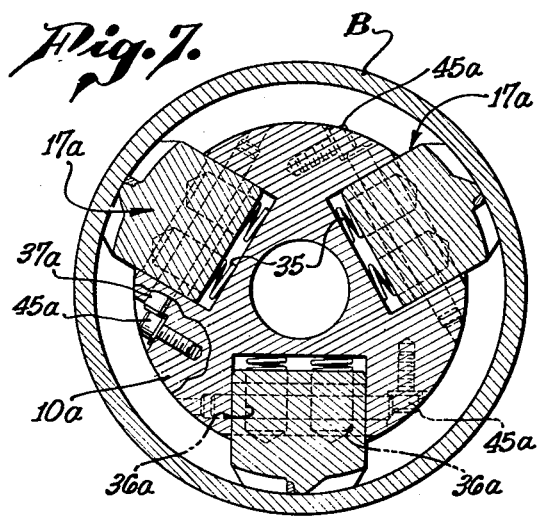
Thomas M. Ragan, INVENTOR.

United States Patent Office 2,713,913
Patented July 26, 1955

2,713,913

CASING SCRAPERS AND FEELERS

Thomas M. Ragan, Downey, Calif., assignor to Baker Oil Tools, Inc., Los Angeles, Calif., a corporation of California Original application January 11, 1949, Serial No. 70,323. Divided and this application March 16, 1953, Serial No. 342,446

7 Claims. (Cl. 166—173)

The present invention relates to devices for cleaning the inner walls of well casings, liners and similar conduits, and more particularly to casing scrapers capable of removing a film or cake of hardened cement, synthetic resin, mud, paraffin, gunshot burrs, bullets, and various other types of undesired materials from the walls of such conduits.

This application is a division of my application for "Casing Scrapers and Feelers," Serial No. 70,323, filed January 11, 1949, now abandoned.

An object of the invention is to provide improved devices for scraping the walls of well conduits.

Another object of the invention is to enable the entire circumference of the wall of the well conduit to be scraped by longitudinally moving the scraping tool, and without rotating it. The scraping action is also performable by rotating the tool.

A further object of the invention is to provide a device capable of scraping the entire circumference of a well conduit wall by longitudinally moving the device, in which the device tends to center itself automatically in the well conduit.

Yet another object of the invention is to provide improved stop devices for limiting the extent of lateral outward expansion of casing scraper cutters and for holding the cutters in assembled relation on the body of the scraper.

Still another object of the invention is to provide stop devices for limiting the extent of lateral outward expansion of casing scraper cutters, which do not materially weaken the body of the scraper or the cutters themselves.

Another object of the invention is to provide stop devices for limiting the extent of lateral outward expansion of casing scraper cutters, in which the stop devices are arranged in such manner as to avoid interference with one another.

A further object of the invention is to provide a casing scraper capable of being both assembled and dismantled in a simple and facile manner.

A further object of the invention is to provide a casing scraper capable of acting as a feeler in locating bullets and other restrictions in a well conduit as an incident of moving the tool longitudinally in the conduit.

Yet another object of the invention is to provide a casing scraper having a large number of cutting teeth and tooth surfaces, thereby increasing the effective life of the cutters.

This invention possesses many other advantages, and has other objects, which may be made more clearly apparent from a consideration of several forms in which it may be embodied. Such forms are shown in the drawings accompanying and forming part of the present specification. These forms will now be described in detail, illustrating the general principles of the invention; but it is to be understood that such detailed description is not to be taken in a limiting sense, since the scope of the invention is best defined by the appended claims.

Referring to the drawings:

Figure 1 is a side elevation of a casing scraper disposed in a well casing or similar conduit;

Fig. 2 is an enlaraged front elevation of part of the scraper shown in Fig. 1;

Fig. 3 is an enlarged cross-section taken along the line 3—3 on Fig. 1;

Fig. 4 is a longitudinal section taken along the line 4—4 on Fig. 2;

Fig. 5 is a front elevation of part of a modified form of casing scraper;

Fig. 6 is a longitudinal section taken along the line 6—6 on Fig. 5;

Fig. 7 is a cross-section taken along the line 7—7 on Fig. 5.

In the form of invention disclosed in Figs. 1 to 4, inclusive, a generally cylindrical, elongate scraper body 10 has its upper pin 11 threaded into the lower end of a string of drill pipe, or other tubular string A. The lower end of the body may be formed as a threaded box 12 attachable to the upper pin 13 of the body 14 of a drill bit. The drill bit may be omitted, if desired, in performing a scraping operation on a string of well casing B, or other well conduit in which the tool is to be run.

The elongate body 10 has a central passage 15 extending throughout its length, to enable circulating fluid to be pumped down the drill string A and completely through the elongate body 10. The fluid can flow through the usual central passage 16 in the drill bit, when a drill bit is used, for discharge from the latter and upward flowing around the body 10 to flush cuttings and other materials to the top of the well casing. In the absence of a drill bit, the circulating fluid exits from the lower end of the body 10 for upward passage therearound to the top of the well casing.

The body 10 is provided with a plurality of sets of scraper blades or cutters 17 that are adapted to be urged outwardly against the inner wall of the casing B and effectively scrape any foreign substances therefrom. The cutters are preferably arranged around the body in such manner as to cover collectively substantially the entire circumference of the well casing. Because of this arrangement, the entire surface of the casing wall can be scraped merely by moving the scraping tool longitudinally within the casing and without rotating it. This 360 degree coverage of the casing wall by the cutters 17 may be obtained by offsetting sets 18, 19, 20 of scraper cutters with respect to one another, in the manner described hereinafter.

Each scraper blade or cutter 17 is slidably mounted within a longitudinally extending groove 21 formed in the body 10 of the tool. The longitudinal, central plane of this groove may be disposed radially of the tool body or it may be offset with respect to this radial plane, if desired. Each groove has top and bottom end walls 22, 23 parallel to one another, and also parallel side walls 24, 25 extending outwardly from the bottom or base 26 of the groove. The corners 27 formed between the side walls and end walls may be rounded, in order to facilitate formation of the grooves 21 by use of an end mill. It is to be appreciated, however, that these corners may be formed as right angles, if desired.

Each cutter 17 has side walls 28, and also top and bottom end walls 29, making a sliding fit with the companion walls of the groove 21, in order to prevent tilting of the cutter and confine its path of movement to a srtaight line within the groove. If the corners 27 of the groove are rounded, the corners 30 of the cutter are correspondingly rounded. The cutter has external helical, longitudinally spaced teeth 31, whose outer surfaces are curved to conform to the curvature of the inner wall of the well conduit B being scraped. As depicted in Figs. 1 and 2, the teeth 31 slope downwardly toward the right, with their lower edges preferably provided with hardfacing material 32, such as tungsten carbide, in order to insure long wear and life of the cutter teeth.

In order to prevent catching of the cutters 17 in collar spaces in the casing string B, and to facilitate insertion of the tool within the casing, the upper and lower outer ends 33 of each cutter are beveled or inclined to a substantial extent. Similarly, to prevent the side faces 28 of the cutter, which project beyond the body 10, from engaging certain obstructions, such as bullets, in the well casing and be blocked thereby, the outer portions 34 of the sides of each cutter are beveled or inclined to a substantial extent.

Each cutter 17 is urged outwardly by one or more helical springs 35. Each spring is disposed within a socket 36 formed in the cutter, its outer end bearing against the base of the socket and its inner end against the base 26 of the groove 21. As disclosed in Figs. 1 to 4, inclusive, four compression springs 35 are utilized for urging each cutter outwardly, the springs being disposed in the region of the cutter corners. It is to be understood, however, that the number of springs, their arrangement, and the size of each spring can be varied, depending upon the outward force on the cutter desired.

Each cutter 17 is held in assembled relation on the body 10 and its outward expansion under the influence of the springs 35 limited by a stop device. In Figs. 1 to 4, inclusive, this stop device takes the form of a single stop pin or rod 37 extending transversely and lengthwise through an enlarged central hole 38 in a cutter, both the hole 38 and the rod 37 being substantially parallel to the base 26 of the groove 21. One end 39 of the rod is received within a bore 40 communicating with the groove and terminating in a shoulder 41 against which the end of the rod can abut. The other end 42 of the rod is received within a corresponding bore 43 opening outwardly into an enlarged recess 44.

In assembling the cutter 17 in the groove 21, its springs 35 are placed in its sockets 36 and the cutter inserted in the groove. It is then depressed against the force of the springs and the pin 37 inserted transversely through one body bore 43, completely through the enlarged cutter hole 38, and into the other body bore 40. When fully inserted, the end 42 of the rod may be essentially clear of the side of the recess 44. This rod 37 is prevented from inadvertent removal by a cap screw 45 threaded into a hole 46 in the body 10 disposed at an angle to the rod, the head 47 of the screw being located within the recess 44 adjacent the rod, in order to prevent endwise removal of the latter, so long as the screw is in place. Loosening of the screw 45 may be prevented by a lock washer 48 clamped between the screw head 47 and the body shoulder 49 forming one wall of the recess 44.

It is apparent that when the stop rod 37 is in place, outward movement of the cutter 17 under the influence of the springs 35 is limited by engagement of the inner wall portion of the transverse hole 38 with the rod. In the normal operation of the tool, its insertion into the casing B forces the cutter 17 inwardly against the action of the springs 35, in order to free the cutter from contact with the rod 37, allowing radial movement of the cutter both inwardly and outwardly, to conform to the conditions in the casing (Figs. 3 and 4).

The cutters 17 in each set are preferably symmetrically disposed around the scraper body 10 and lie in the same central cross-sectional plane. Thus, as illustrated in the drawings, the radial planes of the cutters are substantially 120 degrees from one another, thereby effectively centering the scraping tool within the well casing B. The width of each groove 21 and the arcuate extent of the cutter teeth 31 are such as to cover a substantial portion of the circumference of the wall of the well conduit B. Since three sets 18, 19, 20 of cutters are disclosed in the drawings, the cutter teeth in each set preferably subtend a cumulative arc of substantially 120 degrees. That is, the teeth 31 on each cutter 17 extend arcuately about 40 degrees around the tool body 10.

Since each set of cutters does not cover substantially the full circumference of the tool and casing being scraped, the sets 18, 19, 20 of cutters are offset from one another, to insure that they cumulatively cover the entire circumference of the tool. Thus, in the specific arrangement disclosed in the drawings, the intermediate set 19 of cutters 17 is displaced approximately 40 degrees with respect to the upper set 18, whereas the lower set 20 of cutters is displaced in the same direction substantially 40 degrees with respect to the intermediate set 19. By virtue of this arrangement, it is apparent that the cutters 17 in all sets 18, 19, 20 jointly cover substantially the full circumferential extent of the body and the well conduit.

It is to be understood that the number of sets of cutters can be varied, if desired, as well as the arcuate extent of each cutter; so long as the cutters cumulatively cover essentially the entire circumference of the tool body. An effective scraping action can occur even if the cutters cumulatively cover slightly less than the full circumference of the body; so long as the arcuate gaps between the cutters are not too great.

With the stop arrangement disclosed, the parts can be appropriately assembled and also dismantled very readily. The stops 37, themselves, do not cause any material weakening of the scraper body, as becomes evident from an inspection of Fig. 3. Also, the stop devices are disposed in such manner as to avoid interference with one another both during the assembly and dismantling of the parts. Each cutter 17 can be mounted in place independently of the other cutters and without interference.

The uniform distribution of the cutters 17 about the axis of the tool insures that the cutters will center the tool within the well casing. In this respect, the centering action is exceedingly effective because of the several sets of cutters used.

In the operation of the tool, it is lowered in the well casing. During this lowering action, the cutter teeth 31 will scrape the cement sheath, mud cake, or any other foreign substances from the wall of the well casing B. Rotation of the drill string A and tool may not be necessary, since, so long as the tool can be lowered through the well casing, assurance is had that the entire circumference of the casing is being cleaned, because the cutter teeth 31 collectively cover essentially a full circle. When a restriction in the casing is reached, which cannot be removed merely by longitudinal movement of the tool, evidence of this fact is transmitted to the operator by the inability to further lower the tool. When this condition arises, the tool can be rotated, with the cutters 17 acting upon the restriction until it is removed. During such rotation, the tool will also be gradually lowered to insure complete cleaning of the wall of the well casing B; whether the restriction in the casing consists of a gunshot burr, a bullet, a cement or plastic sheath, or merely of a mud cake. During the scraping operation, either by longitudinal movement or by rotation, circulating fluid is pumped down the drill string A and through the scraper body to flush the cuttings to the top of the well bore.

It is evident that the tool functions as a feeler as well as a casing scraper, since it indicates the presence of restrictions in the well casing as it is being moved longitudinally therewithin.

In Figs. 5, 6 and 7, a modified form of spring arrangement and stop device is shown for each of the cutters. Instead of a single stop pin extending transversely through the enlarged hole of the cutter, as in Figs. 1 to 4, longitudinally spaced upper and lower stop pins 37a are employed at the upper and lower ends of the cutter. These pins extend through enlarged holes 38a in the cutters, and are held in place by cap screws 45a, in essentially the same manner as in the other form of the invention. The springs 35, however, instead of being mounted in the region of the corners of the cutters, are mounted in sockets 36a formed in the medial portion of the cutters, as clearly shown in Figs. 5, 6 and 7. In all respects, however, the operation of a tool with the cutters disclosed in Figs. 5, 6 and 7 is the same as in the form of invention shown in Figs. 1 to 4, inclusive.

The inventor claims:

1. In a casing scraper: a main body adapted for attachment to a drill string, said body having a groove therein defined by top, bottom and side body walls; a cutter slidable laterally in said groove engaging all of said walls to prevent longitudinal and transverse movement of said cutter with respect to said body, said cutter being guided in such movement by all of said walls, said cutter having longitudinally spaced helical teeth; means normally urging said cutter laterally outwardly; and stop means carried by said body and extending through said cutter for limiting the extent of outward movement of said cutter.

2. In a casing scraper: a main body adapted for attachment to a drill string, said body having a groove therein defined by top, bottom and side body walls; a cutter slidable laterally in said groove engaging all of said walls to prevent longitudinal and transverse movement of said cutter with respect to said body, said cutter being guided in such movement by all of said walls, said cutter having longitudinally spaced helical teeth; means normally urging said cutter laterally outwardly; and stop means carried by said body for limiting the extent of outward movement of said cutter, said stop means comprising a member extending through a hole in said cutter and into said body.

3. In a casing scraper: a main body adapted for attachment to a drill string, said body having a groove therein defined by top, bottom and side body walls; a cutter slidable laterally in said groove engaging all of said walls to prevent longitudinal and transverse movement of said cutter with respect to said body, said cutter being guided in such movement by all of said walls, said cutter having longitudinally spaced helical teeth; means normally urging said cutter laterally outwardly; and stop means carried by said body for limiting the extent of outward movement of said cutter, said stop means comprising a member extending transversely of said groove through an enlarged transverse hole through said cutter, said hole being larger in a direction longitudinally of said body than said member to prevent the top and bottom portions of said hole from engaging said member.

4. In a casing scraper: a main body adapted for attachment to a drill string, said body having a groove therein defined by top, bottom and side body walls; a cutter slidable laterally in said groove engaging all of said walls to prevent longitudinal and transverse movement of said cutter with respect to said body, said cutter being guided in such movement by all of said walls, said cutter having longitudinally spaced helical teeth; means normally urging said cutter laterally outwardly; stop means carried by said body for limiting the extent of outward movement of said cutter, said stop means comprising a member extending through a hole in said cutter and into said body, said hole being larger in a direction longitudinally of said body than said member to prevent the top and bottom portions of said hole from engaging said member; and means threaded into said body and engageable with said member for preventing its removal from said hole.

5. In a casing scraper: a main body adapted for attachment to a drill string, said body having a groove therein defined by top, bottom and side body walls; a cutter slidable laterally in said groove engaging all of said walls to prevent longitudinal and transverse movement of said cutter with respect to said body, said cutter being guided in such movement by all of said walls, said cutter having longitudinally spaced helical teeth; means normally urging said cutter laterally outwardly; and stop means carried by said body for limiting the extent of outward expansion of said cutter, comprising a rod extending across said groove between opposed walls of said groove, said cutter having a hole therethrough substantially larger in cross-section than said rod and through which said rod projects, said hole being sufficiently large to prevent engagement of said cutter with said rod in a direction longitudinally of said body.

6. In a casing scraper: a main body adapted for attachment to a drill string, said body having circumferentially spaced grooves therein, each groove being defined by top, bottom and side body walls; a cutter slidable laterally in each groove engaging all of said walls to prevent longitudinal and transverse movement of said cutter with respect to said body, each cutter being guided in such movement by all of said walls, said cutter having longitudinally spaced helical teeth; means normally urging each of said cutters laterally outwardly; and stop means carried by said body for limiting the extent of outward expansion of each cutter, comprising a rod extending across each groove between the side walls of said groove, said cutter having a hole extending therethrough between its sides substantially larger in cross-section than said rod and through which said rod projects, said hole being sufficiently large to prevent engagement of said cutter with said rod in a direction longitudinally of said body.

7. In a casing scraper: a main body adapted for attachment to a drill string, said body having circumferentially spaced grooves therein, each groove being defined by top, bottom and side body walls; a cutter slidable laterally in each groove engaging all of said walls to prevent longitudinal and transverse movement of said cutter with respect to said body, said cutter being guided in such movement by all of said walls, said cutter having longitudinally spaced helical teeth; means normally urging each of said cutters laterally outwardly; and stop means carried by said body for limiting the extent of outward expansion of each cutter, comprising a rod extending across each groove between the side walls of said groove, said cutter having a hole extending therethrough between its sides substantially larger in cross-section than said rod and through which said rod projects, said hole being sufficiently large to prevent engagement of said cutter with said rod in a direction longitudinally of said body, said rods and holes lying in substantially the same central cross-sectional plane.

References Cited in the file of this patent

UNITED STATES PATENTS

| 1,764,373 | Wells et al. | June 17, 1930 |
| 2,184,393 | Luccous | Dec. 26, 1939 |
| 2,272,405 | Grant et al. | Feb. 10, 1942 |
| 2,464,390 | Hammer | Mar. 15, 1949 |